United States Patent
Nelson et al.

(10) Patent No.: US 11,128,987 B2
(45) Date of Patent: Sep. 21, 2021

(54) BLUETOOTH MESH FOR IDENTIFYING AND REPORTING THE LOCATION OF AN EVENT

(71) Applicant: Roar for Good, Philadelphia, PA (US)

(72) Inventors: Richard Nelson, Marlton, NJ (US); Taun Chapman, West Chester, PA (US); Mahmoud Odeh, Philadelphia, PA (US); Yasmine Mustafa, Philadelphia, PA (US)

(73) Assignee: ROAR for Good, Philadelphia, PA (US)

( * ) Notice: Subject to any disclaimer, the term of this patent is extended or adjusted under 35 U.S.C. 154(b) by 0 days.

(21) Appl. No.: 16/813,092

(22) Filed: Mar. 9, 2020

(65) Prior Publication Data

US 2020/0288275 A1    Sep. 10, 2020

Related U.S. Application Data

(60) Provisional application No. 62/815,136, filed on Mar. 7, 2019.

(51) Int. Cl.
  *H04W 4/029* (2018.01)
  *H04W 4/80* (2018.01)
  (Continued)

(52) U.S. Cl.
  CPC ............ *H04W 4/029* (2018.02); *H04W 4/33* (2018.02); *H04W 4/80* (2018.02); *H04W 84/18* (2013.01)

(58) Field of Classification Search
  CPC ......... H04W 4/029; H04W 4/33; H04W 4/80; H04W 88/18; H04W 4/90; H04W 4/02;
  (Continued)

(56) References Cited

U.S. PATENT DOCUMENTS

| | | |
|---|---|---|
| 3,914,692 A | 10/1975 | Seaborn, Jr. |
| 6,836,211 B2 | 12/2004 | Joo |
| (Continued) | | |

FOREIGN PATENT DOCUMENTS

| | | |
|---|---|---|
| CN | 105162890 | 12/2015 |
| CN | 103391595 | 1/2017 |
| (Continued) | | |

OTHER PUBLICATIONS

International Search Report and Written Opinion in PCT/US2020/021711 dated Jul. 17, 2020.

(Continued)

*Primary Examiner* — Meless N Zewdu

(74) *Attorney, Agent, or Firm* — White and Williams LLP

(57) ABSTRACT

Certain embodiments of the disclosure can include methods, devices, and systems for locating an electronic signal sent in a large, enclosed space, including hotels and offices. The embodiments can include initiating a signal from a location within the large, enclosed structure triggered by, for example, atmospheric conditions or user input, among other triggering mechanisms. The signal can then be transmitted via low-energy, low-cost network devices placed efficiently throughout the building. Devices within the network read the message signal and efficiently continue its transmission through the network. When received by a display device, the message can be identified by its originating location and mapped against a layout of the building.

13 Claims, 3 Drawing Sheets

(51) Int. Cl.
*H04W 4/33* (2018.01)
*H04W 84/18* (2009.01)

(58) Field of Classification Search
CPC ..... H04W 4/70; H04W 68/00; H04W 68/005; H04W 88/00; H04W 88/02; H04W 88/08; H04W 4/14; H04W 4/30; H04W 4/35; H04W 4/38; H04W 4/50; H04W 4/021; H04W 84/18; H04W 16/18; H04W 16/00; H04W 16/20; H04W 28/021; H04W 84/20; H04W 84/22; H04W 88/16; H04W 92/02; H04W 92/08; H04W 92/06; H04W 64/00; H04W 64/003; H04W 84/045; H04L 12/2801; H04L 12/2803; H04L 12/2823; H04L 12/2825; H04L 12/283; H04L 29/06421; H04L 29/06428; H04L 29/06442; H04L 12/2807; H04L 12/2816; H04L 67/22; H04L 43/06; H04L 43/065; H04L 43/0817; H04L 51/20; G05B 2219/23108; G05B 2219/25186; G05B 2219/25198; G05B 2219/25215; G05B 2219/31151; G05B 2219/31152; G05B 2219/31153; G05B 2219/33192; G06Q 90/205; H04B 2201/71346; H04B 10/114; H04B 10/1143; H04B 10/1149; Y02D 30/70; Y02D 10/00; Y02D 30/00; Y02D 30/50

See application file for complete search history.

(56) References Cited

U.S. PATENT DOCUMENTS

| | | | |
|---|---|---|---|
| 7,053,770 | B2 | 5/2006 | Ratiu et al. |
| 7,398,097 | B2 | 7/2008 | Parkulo |
| 7,889,066 | B2 | 2/2011 | McKenna et al. |
| 7,894,794 | B2 | 2/2011 | Boss et al. |
| 7,957,737 | B2 | 6/2011 | Lee |
| 8,013,739 | B2 | 9/2011 | Parkulo et al. |
| 8,108,036 | B2 | 1/2012 | Tran |
| 8,208,891 | B2 | 6/2012 | Jacobs et al. |
| 8,275,346 | B2 | 9/2012 | Gottlieb |
| 8,294,568 | B2 | 10/2012 | Barrett |
| 8,321,124 | B2 | 11/2012 | Curatolo et al. |
| 8,428,067 | B2 | 4/2013 | Budampati et al. |
| 8,630,607 | B2 | 1/2014 | Shaikh |
| 8,674,806 | B1 | 3/2014 | Malik et al. |
| 8,687,558 | B2 | 4/2014 | Jackson et al. |
| 8,710,982 | B2 | 4/2014 | Monnerie et al. |
| 8,885,559 | B2 | 11/2014 | Schmidt et al. |
| 9,088,883 | B2 | 7/2015 | Purnadi et al. |
| 9,408,052 | B2 | 8/2016 | Drapkin et al. |
| 9,466,197 | B2 | 10/2016 | Hildick-Pytte |
| 9,485,649 | B2 | 11/2016 | Citrano, III et al. |
| 9,564,041 | B1 | 2/2017 | Dedeaux |
| 9,565,518 | B2 | 2/2017 | Terrazas |
| 9,646,474 | B2 | 5/2017 | Datta et al. |
| 9,686,739 | B2 | 6/2017 | Tran et al. |
| 9,721,456 | B2 | 8/2017 | Thurlow et al. |
| 9,860,724 | B2 | 1/2018 | Kwan et al. |
| 9,867,023 | B2 | 1/2018 | Rauner |
| 9,967,635 | B2 | 5/2018 | Gavade et al. |
| 10,307,060 | B2 | 6/2019 | Tran |
| 2007/0206629 | A1* | 9/2007 | Choi ............................ 370/463 |
| 2008/0278316 | A1 | 11/2008 | Kates |
| 2010/0141428 | A1 | 6/2010 | Mildenberger et al. |
| 2011/0306304 | A1 | 12/2011 | Forutaripour et al. |
| 2012/0249341 | A1 | 10/2012 | Brown et al. |
| 2013/0278416 | A1 | 10/2013 | Button et al. |
| 2014/0292537 | A1 | 10/2014 | Huang et al. |
| 2016/0165405 | A1* | 6/2016 | Shinozuka et al. ..... H04W 4/04 |
| 2017/0039838 | A1 | 2/2017 | Lee et al. |
| 2017/0078845 | A1* | 3/2017 | Wootton et al. ........ H04W 4/023 |
| 2017/0103646 | A1 | 4/2017 | Naidoo et al. |
| 2017/0238129 | A1* | 8/2017 | Maier et al. ............ H04W 4/02 |
| 2017/0311131 | A1* | 10/2017 | South et al. ............ H04W 4/04 |
| 2017/0372568 | A1 | 12/2017 | Wedig et al. |
| 2018/0332434 | A1* | 11/2018 | Kukarni et al. ...... H04W 4/021 |
| 2019/0227096 | A1* | 7/2019 | Chowdhary et al. ........ G01P 15/005 |
| 2020/0128370 | A1* | 4/2020 | Mesirow et al. ....... H04W 4/33 |

FOREIGN PATENT DOCUMENTS

| | | |
|---|---|---|
| CN | 106850436 | 6/2017 |
| WO | 2017137393 A1 | 8/2017 |

OTHER PUBLICATIONS

Zhang, Bo, et al. "BLE Mesh: A practical mesh networking development framework for public safety communications," Tshinghua Science and Technology, vol. 23, No. 3, Jun. 2018 https://ieeexplore.ieee.org/stamp/stamp.jsp?amumber=8400435.

Braunstein, B. et al., "Challenges in using distributed wireless mesh networks in emergency response," Proceedings of the 3rd International ISCRAM Conference, Newark, NJ, May 2006 http://idl.iscram.org/files/braunstein/2006/344_Brauntein_etal2006.pdf.

* cited by examiner

BLUETOOTH MESH FOR IDENTIFYING AND REPORTING THE LOCATION OF AN EVENT

CROSS REFERENCE TO RELATED APPLICATIONS

The present application claims the benefit of U.S. provisional patent application No. 62/815,136 filed on 7 Mar. 2019, the disclosure of which is incorporated in its entirety herein by reference.

FIELD OF INVENTION

The present disclosure relates to electronic location tracking and communication.

BACKGROUND

Presently, large enclosed structures pose many problems to communications within the structures. Transmitting a signal throughout a large, enclosed structure, and identifying the origin of that signal pose unique challenges as compared to an outdoor environment where various telecommunication methods (e.g. GPS, cellular communications, etc.) are available. Cellular communications are spotty at best and often nonexistent the deeper into the building a communications device is located. In some structures, such as hospitals, cellular communications are prohibited in certain parts of the hospital because of the interference that cellular devices can cause with some healthcare machine operation. Further, a cellular phone by itself is not easily accessible in a moment of emergency, and therefore an additional wearable panic button device is often required.

Wi-Fi networks have been tried to attempt to bridge these communication dark spots, but Wi-Fi technology has some problems of its own. For example, Wi-Fi devices are generally power-intensive and expensive to implement in very large structures. Most Wi-Fi devices receive energy from wall power outlets so that a power outage in a building would cease the Wi-Fi device operation. Some conventional systems require their devices to include a BLUETOOTH network adapter as well as a Wi-Fi or cellular adapter for communications. This significantly increases the cost and energy requirements for the device. Finally, in current conventional systems, if there is a single point of failure—because of a dead spot, internet outage, or power outage, for example—that part of the network will fail, and will possibly take down the entire system. In these types of systems, there is no way to know which link has been broken without checking each one individually. A solution is needed that can span wide distances with many walls, floors, ceilings, and other obstacles, and which can operate with low-cost devices that can utilize independent power sources when necessary.

SUMMARY OF THE INVENTION

Some or all of the above needs and/or problems may be addressed by certain embodiments of the disclosure. Certain embodiments can include methods, devices, and systems for location identification and tracking within a large, enclosed building. According to one embodiment of the disclosure, there is disclosed a method. The method can include detecting a condition at a location. The method can then evaluate that condition based on, for example, severity. The method can transmit an electronic signal from a first network adapter based on the evaluation. The method can also include receiving that signal from a second network adapter. And the method can include identifying the location of the origin of the signal, and the location of the condition.

According to another embodiment of the disclosure, there is disclosed a device. The device can include at least one sensor to detect a condition at a location within an enclosed building. The device can include at least one microprocessor to perform computer operations required or desired by the device and to carry out computer-readable instructions stored on at least one computer memory of the device. The computer instructions can include operability to evaluate the condition or conditions detected by the one or more sensors. The instructions can be further operable to transmit an electronic signal based on the evaluation. The computer-readable instructions can also be operable to receive the signal at a different endpoint of the device, and then forward the signal on, and can identify the location of the originating condition.

According to another embodiment of the disclosure, there is disclosed a system. The system can include a plurality of devices networked together to communicate within an enclosed building. The system can also include at least one device capable of network communication outside the enclosed building. And the system can include a display screen or control center where the originating location of a signal, such as an emergency signal, can be displayed against a floor plan of the enclosed building, for example.

Other embodiments, devices, systems, methods, aspects, and features of the disclosure will become apparent to those skilled in the art from the following detailed description.

BRIEF DESCRIPTION OF DRAWINGS

The detailed description is set forth with reference to the accompanying drawings, which are not necessarily drawn to scale. The use of same reference numbers in different figures indicate similar or identical terms.

DETAILED DESCRIPTION OF THE PREFERRED EMBODIMENTS

In order that the present invention may be fully understood and readily put into practical effect, there shall now be described by way of non-limiting examples of preferred embodiments of the present invention, the description being with reference to the accompanying illustrative figures.

Figure 1:
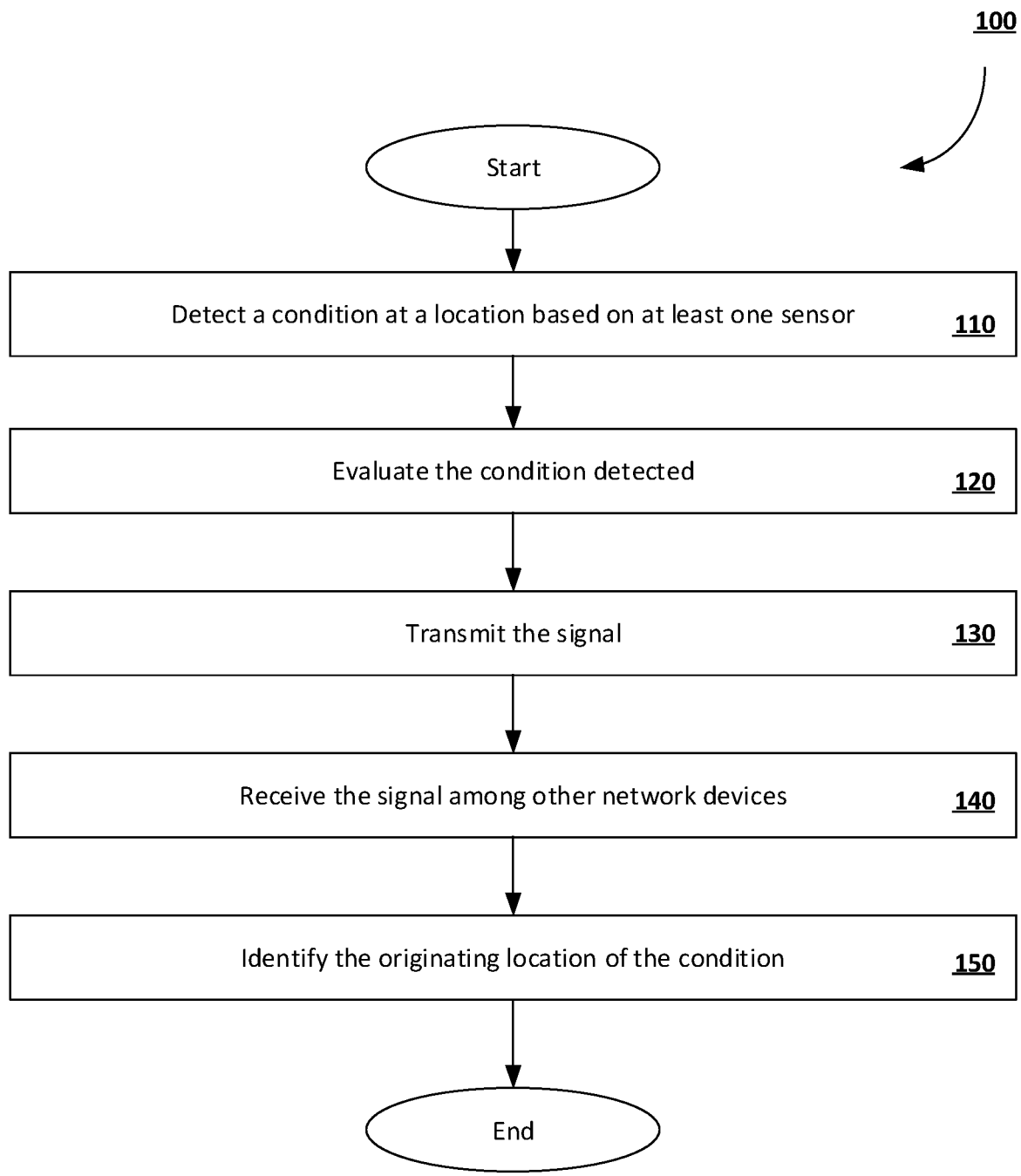
FIG. 1 is a flow diagram of an example method of signal transmission and location identification within an enclosed building, according to an embodiment of the disclosure.

Certain embodiments herein relate to location identification and tracking within a large, enclosed building. Accordingly, a method can be provided to identify and track an electronic signal within an enclosed building. For example, FIG. 1 is a flowchart illustrating a process 100 for location identification, according to various aspects of the present disclosure. The process 100 can begin at block 110. At block 110, process 100 can detect a condition at a location within a large, enclosed building. The building can be of any size, and among the largest buildings. For example, the building can be a large warehouse, office building, hospital, hotel, and government building. Some of these buildings often include objects and structures which can serve as obstacles for computer network communication. Process 100 can serve to mitigate or avoid these obstacles to ensure network communication with minimal or no "dead spots."

The type of condition detected can include an environmental condition, a pressure exerted by a person, or the passage of a time period. In some embodiments, the detection can be triggered by a person pressing a button on a mobile or wearable device. The sensor can detect the pressure exerted by the person and emit an alert signal. In some embodiments, the signal can include information about the device, the wearer, and the location. In other embodiments, the signal might not include any identifying information, and the device emitting the signal may focus its efforts on emitting as strong a signal as possible so that the emission can be detected as broadly as possible.

At block 120, process 100 can evaluate the condition that was detected. If the condition is pressure exerted by a person, then process 100 can determine if the pressure was exerted intentionally or accidentally. For example, if the pressure is detected to be exerted for a second or less, process 100 can determine this is an accidental pressure and that, therefore, no alert signal needs to be sent. In some embodiments, process 100 can respond to an accidental pressure with haptic feedback, such as vibration, light, or sound, to convey a message to the person, such as that the device is in proper working order. In other embodiments, process 100 can evaluate that the pressure exerted requires that an alert signal be sent, for example if the pressure exerted is detected to be for a longer duration, such as 3 to 4 seconds or more. In some embodiments, process 100 can additionally or alternatively include other sensors, such as environmental sensors. These environmental sensors can include sensitivity for the detection of excessive sound, such as to detect an explosion or gunshot; temperature, such as to detect fire or deviation from acceptable and comfortable conditions; humidity, such as to detect a water leak. Process 100 can evaluate a current reading of an environmental condition for appropriateness and make a determination whether an alert signal will be sent. When detecting the passage of a time period, process 100 can evaluate how much time has passed since a previous transmission and, if appropriate, transmit another signal based on this period regularity.

At block 130, process 100 can transmit the signal to the network, including the location of the alert and the identity of the wearer, if any. Network nodes can also regularly report non-emergency messages such as their individual status including battery level, primary mesh network connection partner, and mesh cluster size. These types of information can be reported hourly if desired. Other types of information can be reported less often if desired, such as nearby nodes and information about all mesh connection partners. In some embodiments, this transmission can include a network adapter. Any network adapter fit for the purpose can be used, such as BLUETOOTH, Wi-Fi, and cellular technologies, and the like. In some embodiments, low-energy network devices are desirable to promote longer lasting components and devices within process 100. For example, BLUETOOTH low energy (BLE) technology can be utilized by process 100 to promote low cost components and low power usage of a system running process 100. In some embodiments, the initial signal emitted, by a triggering condition for example, might not include a network adapter. In these embodiments, a network device within range of the originating signal can be used to communicate an alert on the network. The alert device can transmit the originating signal to any device in range, and any receiving device can then retransmit the signal, along with additional information about the location for example, to other devices, so that the signal travels through the network. In some embodiments, each device can broadcast a signal so that all other devices can receive, process, and retransmit the signal as necessary. In other embodiments, in addition to broadcasting, the signal can be unicast or multicast, that is, sent only to specific devices of the network, rather than to all devices within communicative reach.

At block 140, process 100 can receive a signal sent based on an initiating condition. As is also true at block 130, the network communication received at block 140 can be of varying and multiple technologies and protocols.

At block 150, process 100 can identify the originating location of the condition. The signal received at block 140 can include message information about the condition, originating device, and location, among other things. In some embodiments, the signal might not include any identifying information, and the receiving step can rely on the strength and direction of the signal for identification.

In addition or in substitution to these named steps, process 100 can also include other steps. For example, process 100 can include deactivating an alert after the alert has been reviewed and resolved at an endpoint. The deactivation can be manual and it can be algorithmic based, for example, on an evaluation of the condition(s) that triggered the alert.

The operations described and shown in process 100 of FIG. 1 can be carried out or performed in any suitable order as desired in various embodiments of the disclosure, and process 100 can repeat any number of times. Additionally, in certain embodiments, at least a portion of the operations can be carried out in parallel. Furthermore, in certain embodiments, fewer or more operations than described in FIG. 1 can be performed.

Process 100 can optionally end after block 150.

Figure 2:
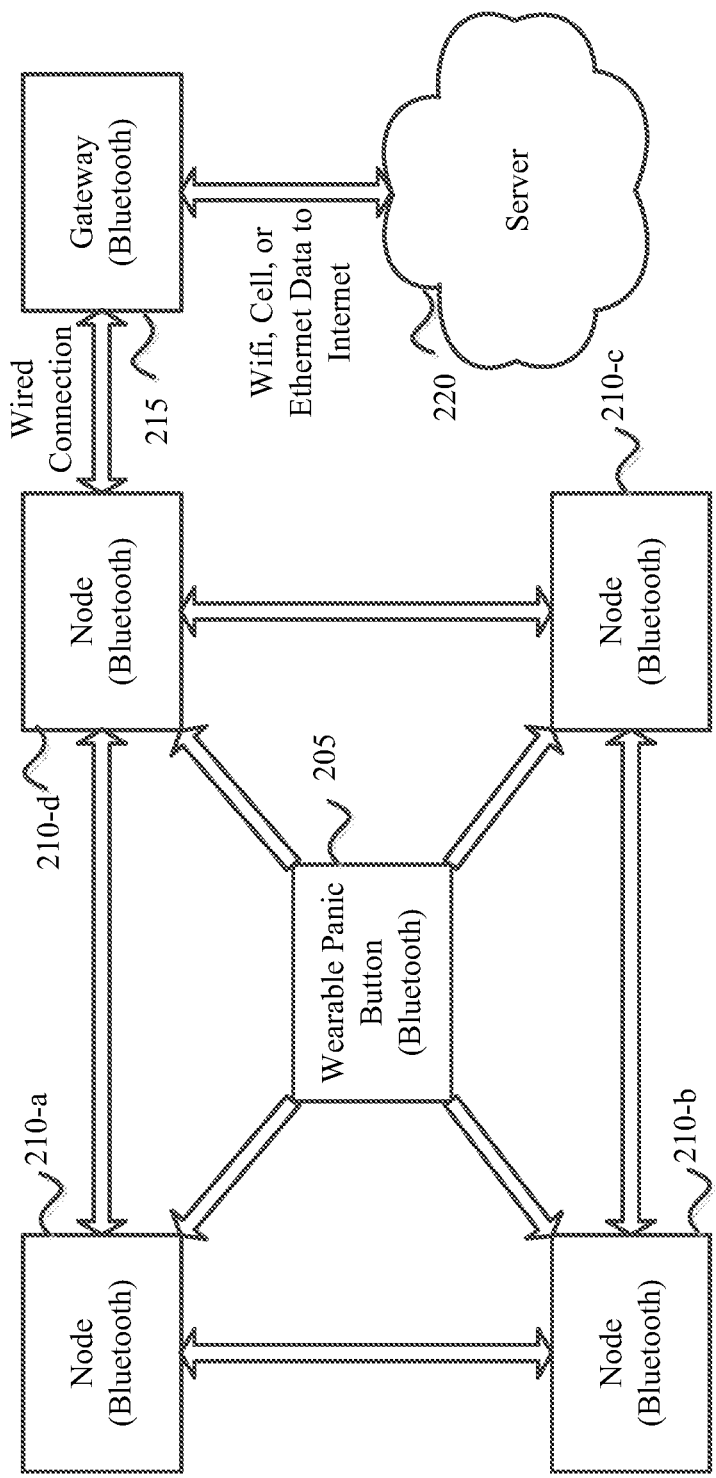
FIG. 2 illustrates a block diagram representing a location tracking device, according to an embodiment of the disclosure.
Figure 3:
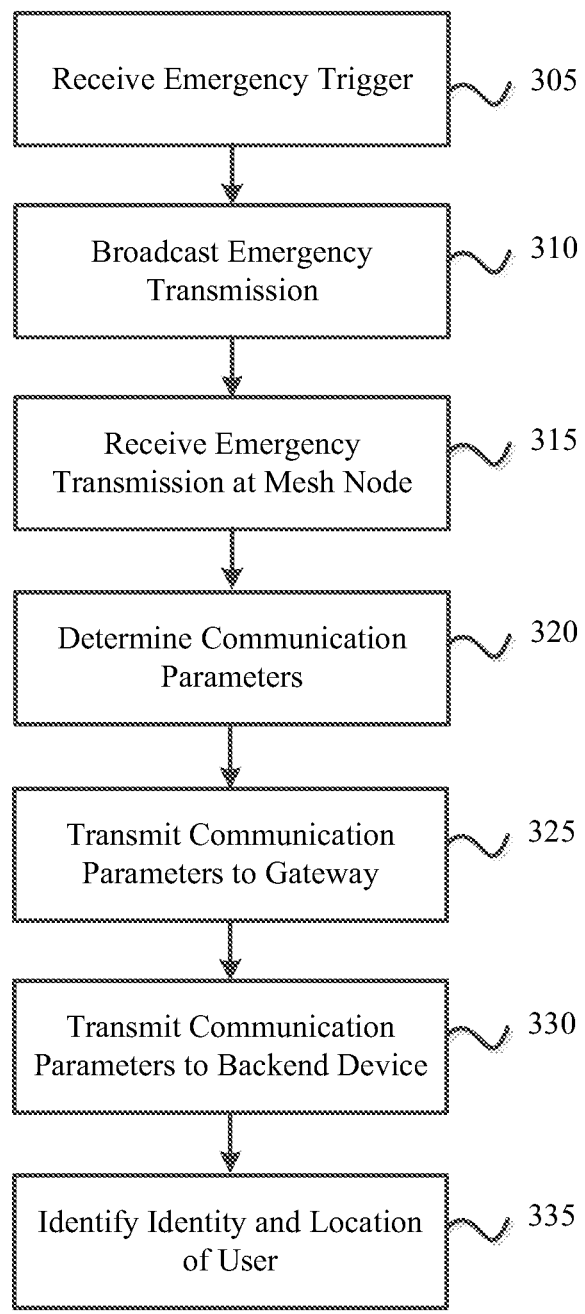

According to another embodiment of the disclosure, there is provided a device. For example, device 200 can be provided for location identification and tracking. Device 200 can include computer and electronic hardware and software necessary or desirable for diverse and ad hoc network communication. FIG. 2 depicts an example schematic diagram representing one embodiment for location identification and tracking. Device 200 can include an originating component 205 such as an emergency button, sensor, or wearable panic button. Component 205 can include its own power storage such as a rechargeable or replaceable battery, and can include a standard method of attachment such as a clasp or magnet. Component 205 can include at least one sensor capable of detecting one or more triggering conditions, at least some of which can be mobile sensors. In some embodiments, component 205 can include a sensor operable to detect a pressure exerted by a person in contact with the sensor. For example, component 205 can detect a person pressing a button of component 205. In some embodiments, component 205 can detect one or more environmental conditions in proximity of its one or more sensors. For example, at least one sensor of component 205 can detect the humidity and/or ambient temperature around a sensor. Component 205 can also include a sensor to detect the noise level nearby. Component 205 can include a sensor to detect the passage of a time period, and to trigger every time that period expires.

Device 200 can include at least one network node 210 to communicate the condition internally along the network. Device 200 can include many nodes 210, and the nodes 210 can be of uniform or varying network technologies and protocols. As depicted in FIG. 2, for example, alert device 205 and all nodes 210 (210-*a*, 210-*b*, 210-*c*, 210-*d*) can use BLUETOOTH technology, such as BLE. In some embodiments, device 205 can be BLE, some nodes 210 can be BLE, and other nodes 210 can use Wi-Fi. The network can be a mesh network, and can include ad hoc components and connections. Some nodes 210 can use wireless local area networking (WLAN) while other nodes, and other network components, can utilize wired components or other technologies. Nodes 210 can include independent power sources and can also share a power source with another node 210 or other device.

Device 200 can also include a gateway 215 to communicate outside the enclosed building network. In some embodiments, device 200 can include multiple gateways 215 and multiple access points. These additional components can be redundant for failover purposes, and the workload can be distributed among them. Gateway 215 can include multiple network adapters such as BLE to communicate with the internal network and Wi-Fi, cellular, or ethernet to communicate outside the enclosed building. In this way, low-cost and low-energy network components can compose the internal building network with only minimal higher-cost and higher-energy components utilized for external communication. Gateway 215 can then use one or more of its network adapters to communicate the alert initiated by component 205 to a third party such as a server 220. The third party 220 can then display the alert and the map of the location, such as via a floor plan, on a computer monitor to be attended by a user, such as a human user monitoring emergencies. In some embodiments, server 220 can be an emergency contact designated for the alert.

Device 200 can handle multiple and many alert signals. In embodiments that include a display of the alert and the floor plan of the building, device 200 can also include updated positioning of the alert, if the alert has indeed changed locations. In some situations, if component 205 is being worn or handled by a person, that person may change locations within the building, and this updated location information is critical in resolving the alert. For example, if the person is in trouble, the updated location is necessary to direct emergency personnel to the alert. In other situations, such as when component 205 is attached to an object being sought for inventory, the updated location is necessary for finding the object in the unexpected location.

According to another embodiment of the disclosure, there is provided a system. For example, a system can be provided for detecting a condition in a large, enclosed building, communicating that condition within the difficult network environment of building with its walls, ceilings, floors, and many other obstructions, and then communicating the condition outside the building's confines for attention. The system can include an alert device that can be mobile and, in some embodiments, wearable. The alert device can be worn on a lapel, sleeve, pocket, or anywhere else it would be convenient and easy to trigger manually, even in an extreme emergency. When activated, an alert device can vibrate and/or illuminate its lights such as LEDs.

The system can include a plurality of network devices, or smart beacons, to transmit a signal sent from an originating device. It is not unusual for the system to include hundreds or thousands of internal network nodes. The originating signal can be an emergency signal sent by a person or otherwise triggered by a condition, such as an environmental condition within the building or a certain passage of time for that device. In large buildings, and in buildings with many obstacles, such as hospitals and hotels, the system can include a multitude of network devices such that the strength of the signal will be certain to travel to its necessary endpoint. Smart beacons can be mounted within twenty-five feet (25 ft.) of another smart beacon or gateway. To mitigate the need for frequent changing or charging of the batteries for the many network devices, the system can include low-energy technology, such as BLE communication. And to mitigate the cost of using a large number of network devices in large, complex environments, the system can include low-cost network components. The system's usage of low-cost components can also increase some redundancy in the network connectivity by including slightly more network components than absolutely required. In this way, the failure of a single network component would not mean the failure of the system as a whole, and this is a different outcome than if the network were sparsely populated with more expensive and fewer network components, which are still subject to a similar failure rate despite the increased cost.

The system can also include at least one external network device capable of communicating, not only with the network nodes internal to the building, but also capable of communicating with an outside computer network, such as the internet. In some embodiments, internal nodes such as smart beacons can send the signal to a gateway, and the gateway can send the signal via an access point to an endpoint location. An access point can also include a failover network adapter, such as an LTE, or cellular, connection. In the embodiment where the internal nodes use BLE, the external node can include both BLE and at least one other network adapter, such as Ethernet or cellular. And whereas the internal network nodes can be located virtually anywhere within a building, even a rigidly designed building, the at least one external network device must be in a location where communicative access to an external network is possible. At the same time, the external network device must still be in communicative reach with at least one of the internal network nodes. The external network device can then transmit the event, such as the emergency or alert, to a third party, such as an emergency contact or computer display. In some embodiments, the signal will be transmitted to a central processing storage area of the system, or other appropriate storage for usage with a particular system. In some embodiments, the processing and storage of system-specific information can be in either or both of a cloud-computing location or on-site.

The system can include an endpoint, such as an alert console or computer screen, to display the location of the electronic signal sent by the alert device. In some embodiments, the alert console can include a tablet computer used on-site for displaying and managing the system. This can be displayed based on a floor plan, for example, and the system can display any other information contained in the signal in addition to the location of the originating alert. In some embodiments, the nature of the alert can also be contained in the message, such as the humidity, temperature, noise, and time sensor readings. In some embodiments, the alert device can be worn by a hotel employee, or in fact many hotel employees, and the system can track the wearers while they are on the work premises. The display screen can then show which employees are nearest to one location or another, in case that location is in need of attention. In some embodiments, the alert device can be worn by hospital staff, doctors, and nurses and the multitude of emergency signals and conditions that regularly occur in a hospital can all be displayed and tracked by the system. In some embodiments, the transmission of additional signals can be evaluated substantially synchronously with the receipt of the signals, such that the information displayed is substantially live tracking. In some embodiments, when an alert is triggered, the alert devices as well as other components can be operable to record sound and video. This sound and video can also be transmitted along the network to the endpoint, and can be stored at the device for later retrieval.

The system can include multiple and redundant sources of power. In some embodiments, the alert devices and the plurality of network nodes can be partially or completely reliant on battery power, and the batteries can be rechargeable or replaceable. The system can also include a charging station and instructions to have the alert devices returned after each staff shift, and charge the devices until pickup for the next shift. In some embodiments, the network nodes can rely on a wired energy source. Similarly, the external network devices can be primarily powered by wired energy, but revert to batteries or uninterruptible power sources if there is a power outage. In this way, the system's reliability and uptime are increased.

In some embodiments, the system can include a map importation module in order to utilize a building's floor plan into the electronic system. For example, if the building's floor plan exists only on a sheet of paper, the system's importation module can convert that image, such as through electronic scanning, and then recognize the components of the electronically scanned into usable information which the system can use to disseminate locations. Additionally, the map importation module can also convert other formats of floor plans, such as spreadsheets, into information that can be used by the system's identification and display algorithms. In some embodiments, the layout of the networked nodes can be based on this imported floor plan, including with the aid of optical character recognition, a camera, and/or room number. Using this floor plan information, network nodes can then be associated in a database with a location in the building. In some embodiments, network nodes can be assigned unique identifiers, placed into rooms as needed, and then mapped and recognized by the system when it initializes.

As desired, embodiments of the disclosure may include devices and systems with more or fewer components than are illustrated in the drawings. For example, in some embodiments an alert device can send a signal directly to a gateway without first transmitting through the network nodes. Additionally, certain components of the devices and systems may be combined in various embodiments of the disclosure. The devices and systems described above are provided by way of example only.

The features of the present embodiments described herein may be implemented in digital electronic circuitry, and/or in computer hardware, firmware, software, and/or in combinations thereof. Features of the present embodiments may be implemented in a computer program product tangibly embodied in an information carrier, such as a machine-readable storage device, and/or in a propagated signal, for execution by a programmable processor. Embodiments of the present method steps may be performed by a programmable processor executing a program of instructions to perform functions of the described implementations by operating on input data and generating output.

The features of the present embodiments described herein may be implemented in one or more computer programs that are executable on a programmable system including at least one programmable processor coupled to receive data and/or instructions from, and to transmit data and/or instructions to, a data storage system, at least one input device, and at least one output device. A computer program may include a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions may include, for example, both general and special purpose processors, and/or the sole processor or one of multiple processors of any kind of computer. Generally, a processor may receive instructions and/or data from a read only memory (ROM), or a random access memory (RAM), or both. Such a computer may include a processor for executing instructions and one or more memories for storing instructions and/or data.

Generally, a computer may also include, or be operatively coupled to communicate with, one or more mass storage devices for storing data files. Such devices include magnetic disks, such as internal hard disks and/or removable disks, magneto-optical disks, and/or optical disks. Storage devices suitable for tangibly embodying computer program instructions and/or data may include all forms of non-volatile memory, including for example semiconductor memory devices, such as EPROM, EEPROM, and flash memory devices, magnetic disks such as internal hard disks and removable disks, magneto-optical disks, and CD-ROM and DVD-ROM disks. The processor and the memory may be supplemented by, or incorporated in, one or more ASICs (application-specific integrated circuits).

The features of the present embodiments may be implemented in a computer system that includes a back-end component, such as a data server, and/or that includes a middleware component, such as an application server or an Internet server, and/or that includes a front-end component, such as a client computer having a graphical user interface (GUI) and/or an Internet browser, or any combination of these. The components of the system may be connected by any form or medium of digital data communication, such as a communication network. Examples of communication networks may include, for example, a LAN (local area network), a WAN (wide area network), and/or the computers and networks forming the Internet.

The computer system may include clients and servers. A client and server may be remote from each other and interact through a network, such as those described herein. The relationship of client and server may arise by virtue of computer programs running on the respective computers and having a client-server relationship to each other.

The above description presents the best mode contemplated for carrying out the present embodiments, and of the manner and process of practicing them, in such full, clear, concise, and exact terms as to enable any person skilled in the art to which they pertain to practice these embodiments. The present embodiments are, however, susceptible to modifications and alternate constructions from those discussed above that are fully equivalent. Consequently, the present invention is not limited to the particular embodiments disclosed. On the contrary, the present invention covers all modifications and alternate constructions coming within the spirit and scope of the present disclosure. For example, the steps in the processes described herein need not be performed in the same order as they have been presented, and may be performed in any order(s). Further, steps that have been presented as being performed separately may in alternative embodiments be performed concurrently. Likewise, steps that have been presented as being performed concurrently may in alternative embodiments be performed separately.

What is claimed is:

1. A method for communicating an event in an enclosed building, the method comprising:
   detecting, via at least one mobile sensor at a mobile device, a condition;
   evaluating, via at least one microprocessor at the mobile device, the condition;
   transmitting, from a first BLUETOOTH network adapter at the mobile device, a first signal [[based on]] in response to the evaluation to a second low-energy BLUETOOTH network adapter at a first stationary device associated with a known location;
   transmitting, from the first stationary device to a gateway device via a low-energy BLUETOOTH mesh network, a second signal in response to the first signal, the second signal comprising information associated with the first stationary device;
   transmitting, from the gateway device to a server, a third signal in response to the second signal and comprising information associated with the first stationary device; and
   identifying, via a second microprocessor, the location of the condition based on the information associated with the first stationary device transmitted in the third signal and generating an alert signal in response thereto.

2. The method as recited in claim 1, wherein the detecting comprises detecting a pressure exerted by a person on at least a portion of the mobile device.

3. The method as recited in claim 1, wherein the detecting comprises sensing one of humidity, temperature, sound, and an expiration of a time period.

4. The method as recited in claim 1, further comprising transmitting the identification of the location to a third party.

5. The method as recited in claim 1, further comprising tracking, via the second microprocessor, an updated location of the event based on an additional signal from the mobile device.

6. The method as recited in claim 1, further comprising displaying, via at least one display adapter, the location based on a floor plan.

7. The method as recited in claim 1, wherein the first signal, second signal, and third signal further comprise information regarding one or more of the mobile sensor and the mobile device.

8. A system for communicating an event in an enclosed building, the system comprising:
   at least one mobile sensor to detect a condition within the enclosed building and transmit a first BLUETOOTH signal based on the condition;
   a first stationary alert device associated with a known location within the enclosed building, the first alert device comprising a low-energy BLUETOOTH enabled adaptor that receives the first BLUETOOTH signal and transmits a second BLUETOOTH signal to a mesh network of devices in response to the first BLUETOOTH signal, the second BLUETOOTH signal comprising information associated with the first stationary alert device;
   at least one network node that is part of the mesh network, the network node comprising a low-energy BLUETOOTH enabled adaptor that receives the second BLUETOOTH signal and transmits a third signal comprising information associated with the first stationary alert device;
   a network gateway receiving the third signal and transmitting a fourth signal to a processor, the fourth signal comprising information associated with the first stationary alert device; and
   the processor using the information associated with the first alert device to identify the location of the condition within the enclosed building, then generating an alert in response thereto.

9. The system as recited in claim 8, wherein the condition is a pressure exerted by a person on at least a portion of the mobile device.

10. The system as recited in claim 8, wherein the condition is one of humidity, temperature, sound, and an expiration of a time period.

11. The system as recited in claim 8, further comprising an endpoint device to receive the alert.

12. The system as recited in claim 11, wherein the endpoint device is further operable to track an updated location of the condition based on an additional signal.

13. The system as recited in claim 8, further comprising a display of the location of the condition based on a floor plan.

* * * * *

UNITED STATES PATENT AND TRADEMARK OFFICE
CERTIFICATE OF CORRECTION

PATENT NO. : 11,128,987 B2
APPLICATION NO. : 16/813092
DATED : September 21, 2021
INVENTOR(S) : Richard Nelson et al.

Page 1 of 1

It is certified that error appears in the above-identified patent and that said Letters Patent is hereby corrected as shown below:

In the Claims

Column 9, Claim 1, Line 12, please correct as follows:
at the mobile device, a first signal in Signed and Sealed this
Twenty-sixth Day of October, 2021

Drew Hirshfeld
*Performing the Functions and Duties of the*
*Under Secretary of Commerce for Intellectual Property and*
*Director of the United States Patent and Trademark Office*